(12) United States Patent
Paudel

(10) Patent No.: US 11,599,079 B2
(45) Date of Patent: Mar. 7, 2023

(54) STATIC SAFETY ANALYSIS FOR CONTROL-FLOW LINEARIZATION

(71) Applicant: International Business Machines Corporation, Armonk, NY (US)

(72) Inventor: Jeeva Paudel, North York (CA)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 17/211,944

(22) Filed: Mar. 25, 2021

(65) Prior Publication Data
US 2022/0308543 A1 Sep. 29, 2022

(51) Int. Cl.
*G05B 19/042* (2006.01)
*G06F 8/41* (2018.01)

(52) U.S. Cl.
CPC ..... *G05B 19/0428* (2013.01); *G05B 19/0426* (2013.01); *G06F 8/433* (2013.01); *G06F 8/443* (2013.01); *G05B 2219/23146* (2013.01); *G05B 2219/24024* (2013.01)

(58) Field of Classification Search
CPC .... G06G 8/433; G06G 8/443; G05B 19/0426; G05B 19/0428; G05B 2219/23146; G05B 2219/24024
See application file for complete search history.

(56) References Cited

U.S. PATENT DOCUMENTS

| 5,650,948 A * | 7/1997 | Gafter ................ G06F 8/49 716/103 |
| 10,754,744 B2 | 8/2020 | Sanaralingam et al. |
| 2006/0129956 A1* | 6/2006 | Ward ................ G06F 30/3323 716/136 |
| 2013/0219378 A1 | 8/2013 | Glaister et al. |

(Continued)

OTHER PUBLICATIONS

Simon Moll et al. "Partial Control-Flow Linearization" [Online], pp. 543-556, [Retrieved from Internt on on Oct. 3, 2022], <https://dl.acm.org/doi/pdf/10.1145/3296979.3192413>, (Year: 2018).*

(Continued)

*Primary Examiner* — Ziaul A Chowdhury
(74) *Attorney, Agent, or Firm* — Cantor Colburn LLP; Peter Wang

(57) ABSTRACT

A static safety analysis for control-flow linearization receives a control flow graph (CFG) and an intermediate representation of a computer program, and identifies, for a given loop, all memory load instructions belonging to one side of a diamond-shape structure in the CFG. For each representation of an address of each memory load instruction identified, determining whether it is used on all other sides of the diamond-shape structure. Responsive to determining each representation of an address of each memory load instruction on the one side of the diamond-shape structure is used on all other sides of the diamond-shape structure, determining whether an immediate predecessor of a top of the diamond-shape structure for the given loop (Continued)

post-dominates a header of the given loop. Responsive to determining the immediate predecessor of the top of the diamond-shape structure for the given loop post-dominates the header of the given loop, affirming safety of linearization.

15 Claims, 9 Drawing Sheets

(56) References Cited

U.S. PATENT DOCUMENTS

2014/0237460 A1* 8/2014 Schmidt .................. G06F 8/443
717/160
2018/0081747 A1* 3/2018 Viste .................. G06F 11/0766

OTHER PUBLICATIONS

Lim et al.; "Autotuning GPU Kernels via Static and Predictive Analysis;" Computer Science > Distributed, Parallel, and Cluster Computing; arXiv.org > cs > arXiv:1701.08547; Jun. 29, 2017; 10 pages.

Rosemann et al.; "An Abstract Interpretation for SPMD Divergence on Reducible Control Flow Graphs;" Proc. ACM Program. Lang., vol. 5, No. POPL, Article 31, Jan. 2021; 31 pages.

* cited by examiner

FIG. 1

Code snippet 100

```
1   int test(int a[32], int b[32], int c[32]) {
2     int res = 0;
3     for( int i = 0; i < 32; i++ ) {
4       if (a[i] > 0)
5         a[i] = (c[i] + a[i]) * b[i];
6       else
7         a[i] = -(c[i]) * b[i];
8       res |= a[i];
9     }
10    return res;
11  }
```

FIG. 5A

The following notations are used in the above statements:
P: a computer program,
L: a loop,
Ll: a memory load instruction,
A *PostDom* B: a basic block A post-dominates a basic-block B,
DiamondCFG: a portion of the control-flow graph representing one of an *if-else*, *if-then-else* or *switch* statement,
DivergenceBlock: a predecessor of an *if-else*, *if-then-else* or case blocks in a *switch* statement,
Siblings: basic blocks of the control-flow graph forming one of an *if-else*, *if-then-else* or case blocks in a *switch* statement.

```
505   for each L in P
510     for each Ll in L
515       if Ll belongs to a DiamondCFG
520         if DivergenceBlock PostDom LoopHeader
525           if address of Ll has uses in all siblings in DiamondCFG
530             safe to linearize DiamondCFG
```

Code snippet 500

US 11,599,079 B2

STATIC SAFETY ANALYSIS FOR CONTROL-FLOW LINEARIZATION

BACKGROUND

The present invention relates to control flow usage in computer programs, and more specifically, to control-flow linearization of computer programs in a data processing system. Control-flow dependencies introduced by branches and switches within a computer program are major inhibitors to compiler optimizations, such as vectorization. Control-flow linearization is a classic technique for eliminating conditional branches that combines multiple paths of control flow of a respective computer program into a single path of conditional instructions. By converting conditional code into predicated execution, control-flow linearization exposes further optimization opportunities, including loop vectorization.

SUMMARY

According to an embodiment of the present invention, a computer-implemented process for static safety analysis for control-flow linearization. The computer-implemented process comprising in response to receiving a control flow graph (CFG) and an intermediate representation of a computer program, identifying for a given loop, all memory load instructions belonging to one side of a diamond-shape structure in the CFG. A determination is made whether each representation of an address of each memory load instruction on the one side of the diamond-shape structure is also used on all other sides of the diamond-shape structure. In response to a determination that each representation of an address of each memory load instruction on the one side of the diamond-shape structure is also used on all other sides of the diamond-shape structure, the computer-implemented process determining whether an immediate predecessor of a top of the diamond-shape structure for the given loop post-dominates a header of the given loop. In response to a determination the immediate predecessor of the top of the diamond-shape structure for the given loop post-dominates the header of the given loop, the computer implemented process affirming safety of linearization of the diamond-shape structure in the CFG.

In an alternative embodiment of the disclosure, a computer-implemented process for managing control-flow linearization, in response to receiving a control flow graph (CFG) and intermediate representation of a computer program, identifies for a given loop, all memory load instructions belonging to one side of a diamond-shape structure in the CFG. The computer implemented process further determining whether each expression used in an address computation of each memory load instruction on the one side of the diamond-shape structure is also used on all other sides of the diamond-shape structure. In response to a determination that each expression used in an address computation of each memory load instruction on the one side of the diamond-shape structure is also used on all other sides of the diamond-shape structure, the computer implemented process further determining whether an immediate predecessor of a top of the diamond-shape structure for the given loop post-dominates a header of the given loop. In response to a determination the immediate predecessor of the top of the diamond-shape structure for the given loop post-dominates the header of the given loop, the computer implemented process further affirming safety of linearization of the diamond-shape in the CFG.

In an alternative embodiment of the disclosure, a computer-implemented process for managing control-flow linearization, in response to receiving a control flow graph (CFG) and intermediate representation of a computer program, identifies for a given loop, all memory load instructions belonging to one side of a diamond-shape structure in the CFG. The computer implemented process further determining whether each value number of an address of each memory load instruction on the one side of the diamond-shape structure is also used on all other sides of the diamond-shape structure. In response to a determination that each value number of an address of each memory load instruction on the one side of the diamond-shape structure is also used on all other sides of the diamond-shape structure, the computer implemented process further determining whether an immediate predecessor of a top of the diamond-shape structure for the given loop post-dominates a header of the given loop. In response to a determination the immediate predecessor of the top of the diamond-shape structure for the given loop post-dominates the header of the given loop, the computer implemented process further affirming safety of linearization of the diamond-shape in the CFG.

BRIEF DESCRIPTION OF THE DRAWINGS

FIG. 1 is a textual representation of a code snippet in an example of a loop with control-flow divergence in various embodiments of the disclosure;

DETAILED DESCRIPTION

Figure 2:
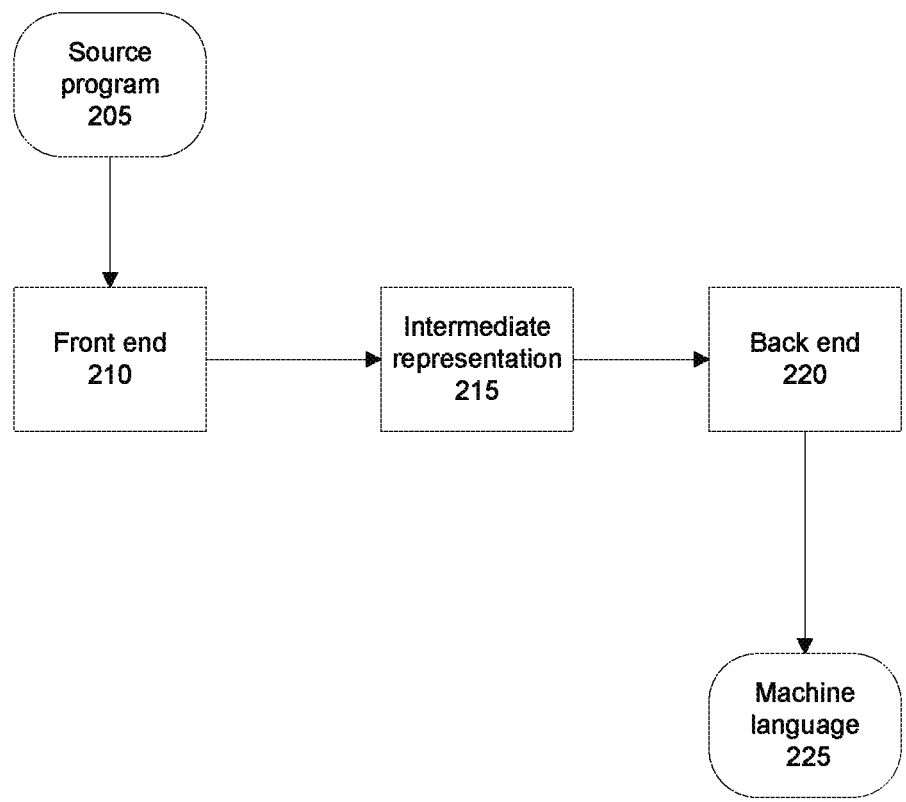
FIG. 2 is a schematic representation of an overview of a compilation process used in an embodiment of the disclosure.

The description, which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following detailed description of the embodiments of the present invention does not limit the implementation of the present invention to any particular data processing system programming language. The present invention may be implemented in any data processing system programming language provided that the Operating System (OS) provides the facilities that may support the requirements of the embodiments of the present invention. Any limitations presented may be quite likely a result of a particular type of OS, data processing system programming language, or data processing system and may not be a limitation of the embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To employ control-flow linearization effectively, a compiler, or compilation system, must typically decide whether a branch is safe to linearize. Existing approaches to control-flow linearization set out to statically prove that all pointer dereferences in each path emanating from control-flow divergence are safe and valid within range of the loop.

With reference now to FIG. 1 is a textual representation of a code snippet as an example of a loop with control-flow divergence. Code snippet 100 has a set of program statements numbered 1 to 11 and includes a body of a for-loop (line 3) which has a control-flow divergence arising from an if conditional statement (line 4). State of the art compilers, including LLVM (a compiler infrastructure, a collection of modular and reusable compiler and toolchain technologies available from https://llvm.org) and GCC (GNU Compiler Collection available from gcc.gnu.org), typically strive to prove that a[i], b[i], and c[i] are actually dereferenceable for all values of i from 0 to 31 (the array may be shorter and a[i] could be 0 for i past the end of an extent of a). In practice, the state of the art compilers typically proceed to prove the dereferenceability property in each sibling path of divergence, for example, lines 5 and 7 of FIG. 1.

In an embodiment of the disclosed invention, control-flow linearization is safe when all pointer dereferences occurring along one path emanating from a control divergence are identical to those pointer dereferences occurring along the remaining paths emanating from the respective control divergence as well. As a result, compilers do not need to statically deduce, or prove, all pointer dereferences are safe and/or valid within range of a respective loop. One skilled in the art would also reasonably conclude a program with unsafe and/or invalid pointer dereferences is also deemed to fail or be erroneous irrespective of control-flow linearization decisions. Moreover, embodiments of the disclosed invention do not invalidate pointer dereferences that are otherwise safe in any way.

FIG. 2 is a schematic representation of an overview of a compilation process used in an embodiment of the disclosure. Compilation process 200 begins with source program code 205 as input to a set of operations using a compilation system. Source program code 205 is consumed by front end 210 of the compilation system. A number of analysis techniques may be employed within front end 210 including lexical, syntactical and semantic analysis. Output of front end 210 is provided in the form of intermediate representation (IR) 215. A format of IR 215 is determined by the compilation system and is dependent upon the tooling used in front end and back end 220 as well as other tools that may consume IR 215. This intermediate representation is the focus of an embodiment of the disclosure. IR 215 is provided as input to back end 220 for use in static analysis and transformation operations including optimization of the intermediate representation and machine code generation. Output of operations occurring using back end 220 is in the form of machine language code 225.

In an embodiment of the disclosure, an enhanced static analysis technique provides a capability for checking legality of potential control-flow linearization to enable removal of control-flow divergence in loops. Therefore, an embodiment of the disclosure enables further optimizations, including loop vectorization, to improve execution-time performance of computer programs in presence of control-flow divergence in forms including if-else, if-then-else, and switch statements.

Safety analysis, in the enhanced static analysis technique of embodiments of the disclosure, derives information from intra-procedural analysis of the computer program and operates on an intermediate code generation phase of an optimizing compiler. Reachable code is part of the source code of a computer program which is executable because a control flow path exists to code from the rest of the computer program. Procedures are referred to as visible, as a result of the static intra-procedural analysis when respective intermediate representations are available. Otherwise, the procedures resulting from the static intra-procedural analysis are referred to as invisible procedures. Examples of invisible procedures are runtime procedures and external library procedures whose respective source code is unavailable. The proposed optimization, in embodiments of the disclosure, applies to only visible procedures.

A simplest unit of control flow in a computer program is a structure referred to as a basic block having a maximal length sequence of straight line, or branch-free, program code. Thus, a basic block is a sequence of operations that always execute together, unless an operation within the sequence raises an operation exception. Program control always enters the basic block at a first operation and exits that basic block at a last operation of the basic block. The last operation may be one of a branch operation, a jump operation, or a predicated operation.

A control-flow graph (CFG) generated from an intermediate representation IR 215 of computer program code 205, models a flow of control within computer program code 205 between the basic blocks in computer program code 205. As a result, the control-flow graph provides, in graphical form, a representation of possible runtime control-flow paths, or order in which program statements are processed, in computer program code 205. The graph produced of this control flow of computer program code 205 is a directed graph in which each node of the directed graph corresponds to a basic block of the computer program. Each edge of this control-flow graph corresponds to a possible transfer of control from one basic block to another basic block.

Figure 3:
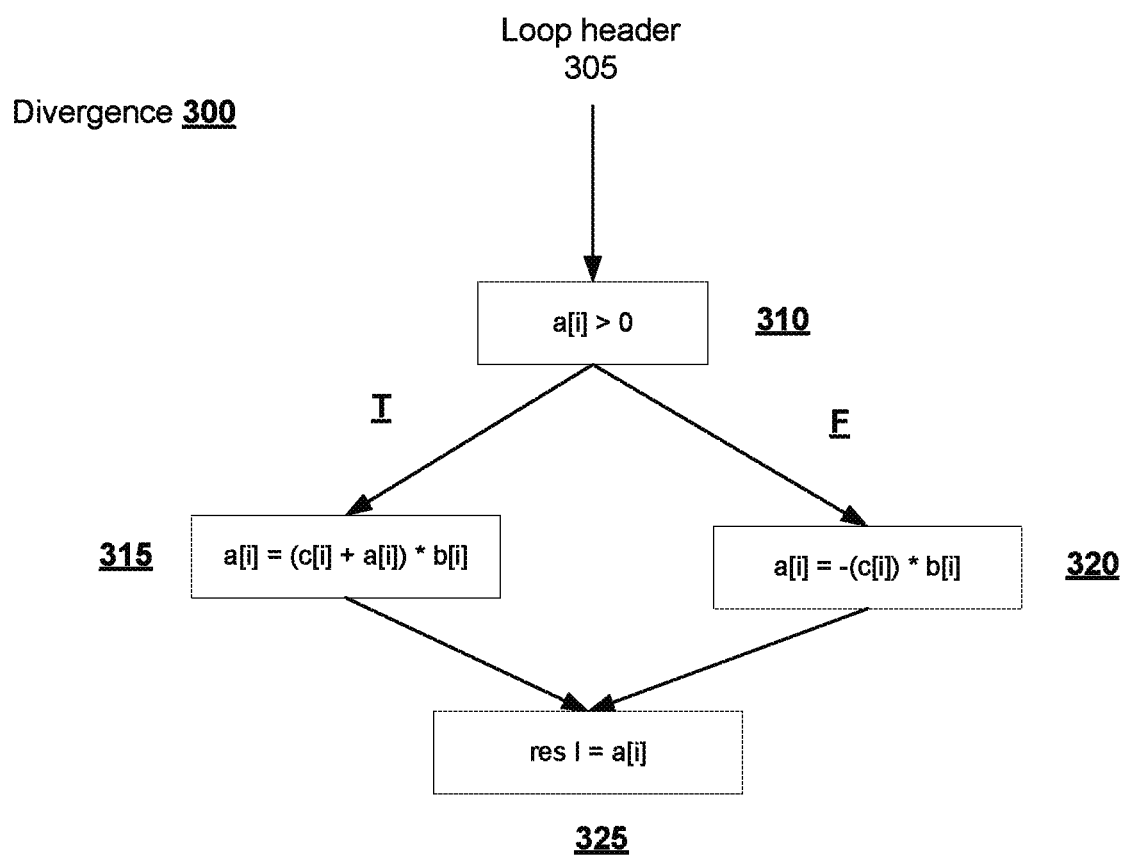
FIG. 3 is a schematic of a divergence in program control, represented in a form characteristic of a diamond shape structure in a control-flow graph corresponding to an if-then-else branch in an embodiment of the disclosure.

FIG. 3 is a schematic of a divergence in program control, represented in a form characteristic of a diamond shape in a control-flow graph corresponding to an if-then-else branch. Divergence 300 is preceded by and flows from loop header 305. A condition of the if-then-else branch is specified with statement 310. When a result of statement 310 is determined to be True, a flow through a left branch of divergence 300 is taken to process statement 315 with control flowing to statement 325. However, when the result of statement 310 is determined to be False, the flow through a right branch of divergence 300 is taken to process statement 320 with control flowing on to statement 325.

Figure 4:
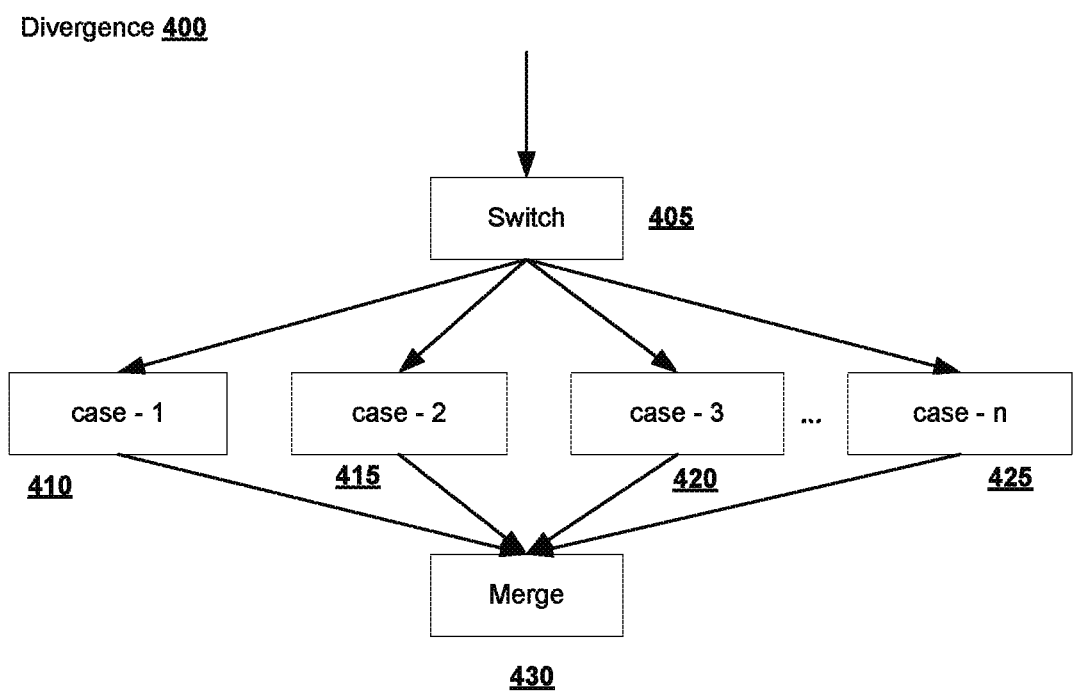
FIG. 4 is a schematic of another example of divergence in program control, represented in the form characteristic of the diamond shape in a control-flow graph corresponding to a switch statement in an embodiment of the disclosure.

FIG. 4 is a schematic of another example of divergence in program control, represented in the form characteristic of the diamond shape in a control-flow graph corresponding to a switch statement. Divergence 400 receives flow from a program as input to switch statement 405. A number of possible cases are presented in case statement 410, case statement 415, case statement 420, and case statement 425. As a result of selecting one of the case statements, flow of the program proceeds to statement 430.

Figure 5:
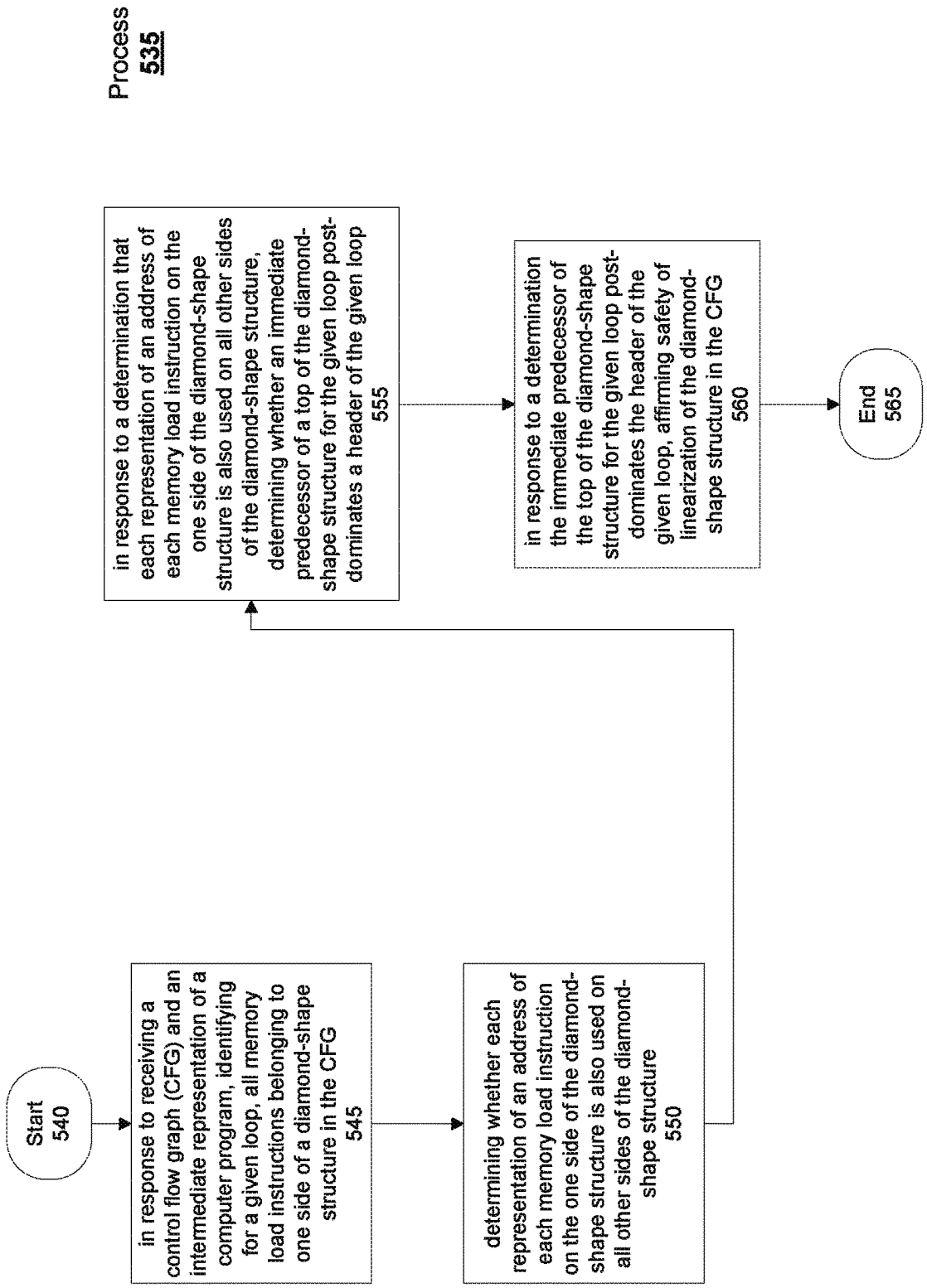
FIG. 5A is a textual example of an enhanced static safety analysis technique used to determine eligibility for control-flow linearization in an embodiment of the disclosure.
FIG. 5B is a flow diagram of an enhanced static safety analysis technique used to determine eligibility for control-flow linearization in an embodiment of the disclosure.

FIG. 5A is a textual example of an enhanced static safety analysis process used to determine eligibility for control-flow linearization in an embodiment of the disclosure. In an embodiment of the disclosure, for a given control flow graph and an intermediate representation of a computer program, a simplified, and less conservative approach than conventionally used, is proposed to check for legality of control-flow linearization aimed at loop vectorization. When reading the code snippet of the example of FIG. 5 the following notations are used: P: a computer program, L: a loop, LI: a memory load instruction, A PostDom B: a basic block A post-dominates a basic-block B, DiamondCFG: a portion of the control-flow graph representing one of an if-else, if-then-else or switch statement, DivergenceBlock: a predecessor of an if-else, if-then-else or case blocks in a switch statement, Sibling blocks: basic blocks of the control-flow graph forming one of an if-else, if-then-else or case blocks in a switch statement.

The static safety analysis process of FIG. 5 starts in response to receiving typed intermediate representation of a computer program as input. Statement 505 begins examination of a given loop L within computer program P. Statement 510 begins examination of each load instruction LI within the loop L. Statement 515 determines whether a load instruction LI of loop L belongs to a diamond-shape in the control-flow graph. Statements 510 and 515 also work to identify all memory load instructions LI in L that belong to one side of the diamond-shape in the control-flow graph. The diamond shape may represent control divergences from structures in the control-flow graph including if-else, if-then-else, and switch statements. FIG. 3 shows a diamond shape in the control-flow graph corresponding to the if-then-else branch in the loop shown in FIG. 1. FIG. 4 shows an example of a diamond shape corresponding to a switch statement. Several known techniques exist to identify specific regions of well-formed loops that form a characteristic diamond-shape in the control-flow graph. For example, a pair of basic blocks in a loop that have a same unique successor and a same unique predecessor constitute basic blocks that are on a respective and different side of the diamond shaped (if-then-else) control flow.

Statement 520 determines whether an immediate predecessor of the top of the diamond-shape DivergenceBlock post-dominates the loop header of loop L. This check ensures safety of hoisting memory access occurring along each branch of the diamond-shape to the loop header. This check is also an integral part of any control-flow linearization technique and is not an imposition of an embodiment of this disclosure and is stated for completeness.

Statement 525 determines whether in this example using an actual address of each memory load LI on one side of the diamond are also used correspondingly on all other sides of the diamond-shape. However, representations of addresses come in different forms including actual addresses, and expressions used in address computations. In another example of addresses representations, variants of existing value numbering techniques can be used to perform this condition check of statement 525. For example, a compiler can determine whether a value number of an address used by a load instruction on one side of the diamond-shaped control-flow graph matches a corresponding value number of the addresses used by load instructions on all other sides of the diamond-shaped control-flow graph. The value numbering technique assigns an identifying number (a value number) to each expression in a particular predetermined manner. As a result, the number assigned has a property in which two expressions can only have the same number when the compiler can prove the two expressions are equal for all possible program inputs. In other words, the compiler can only assign two expressions the same value number when the compiler can prove the two expressions always produce equal values. Therefore statement 525 can accommodate different forms to establish addressability similarity and does not need actual addresses for employing the technique of the disclosure.

Statement 530 identifies an affirmative result of condition checks. In this example, when previous statements are True, it is safe to linearize the diamond-shape.

Eliminating divergent branches in the computer program is a strict requirement for vectorization on central processor unit architectures. On hardware based accelerators, for example, graphic processing units, hardware includes support for a divergent data-parallel execution model. Therefore, control-flow linearization on hardware based accelerators has received much less attention. Nonetheless, reducing or precluding divergence is equally important to make kernel executions more efficient on accelerator devices. The relaxation of safety checks for control-flow linearization introduced in embodiments of the disclosure is a key step in that direction.

FIG. 5B is a flow diagram of an enhanced static safety analysis technique used to determine eligibility for potential control-flow linearization in an embodiment of the disclosure. FIG. 5B is a logical flow corresponding to the statements of FIG. 5A.

Process 535, a computer-implemented process for determining eligibility for potential control-flow linearization, begins (Step 540). In response to receiving a control flow graph (CFG) and an intermediate representation of a computer program, process 535 identifies for a given loop, all memory load instructions belonging to one side of a diamond-shape structure in the CFG (Step 545).

Process 535 determines whether each representation of an address of each memory load instruction on the one side of the diamond-shape structure is also used on all other sides of the diamond-shape structure (Step 550). In response to a determination by process 535 that each representation of an address of each memory load instruction on the one side of the diamond-shape structure is also used on all other sides of the diamond-shape structure, process 535 determines whether an immediate predecessor of a top of the diamond-shape structure for the given loop post-dominates a header of the given loop (Step 555). In response to a determination by process 535 the immediate predecessor of the top of the diamond-shape structure for the given loop post-dominates the header of the given loop, process 535 affirms safety of linearization of the diamond-shape structure in the CFG (Step 560) and terminates thereafter (Step 565).

Figure 6:
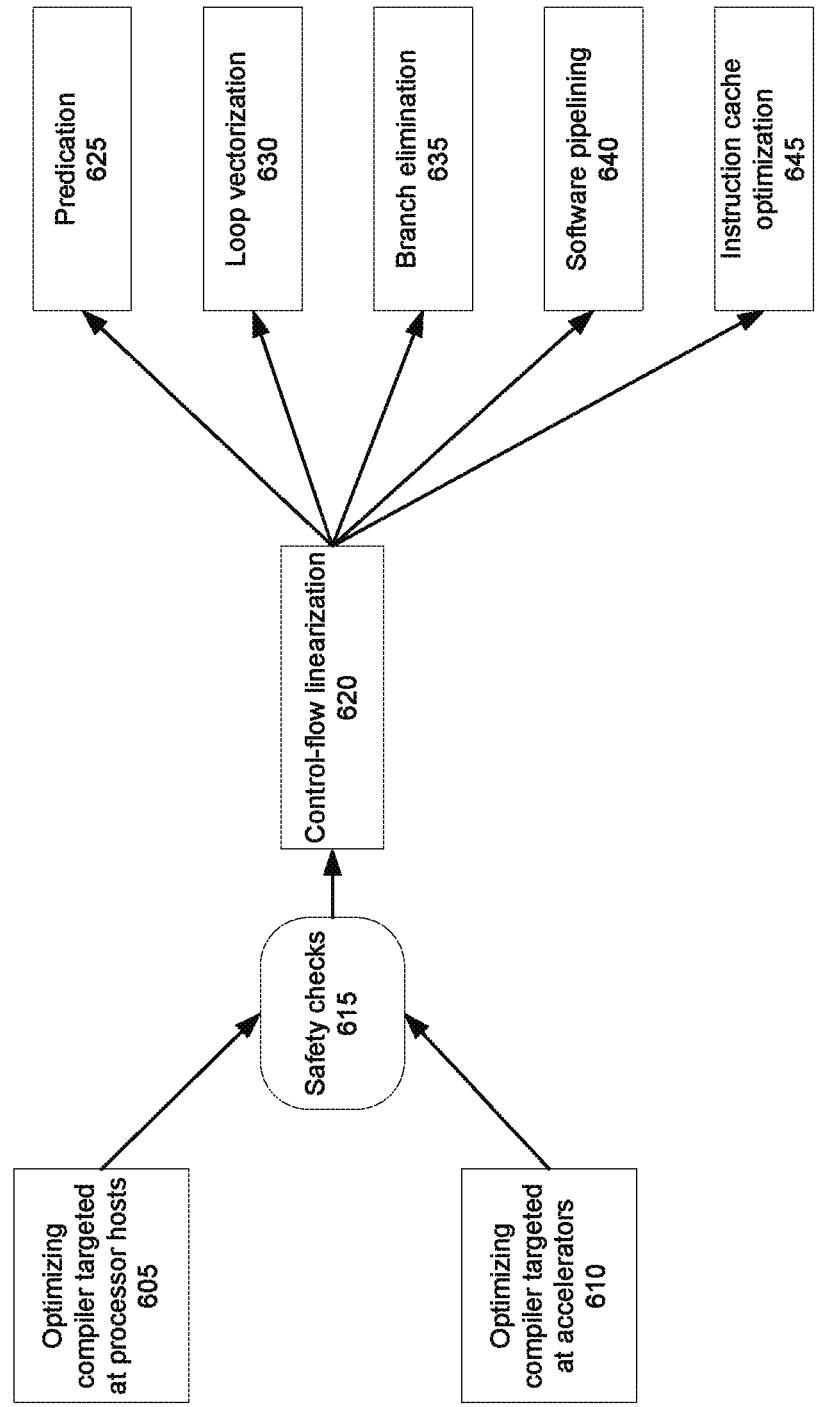
FIG. 6 is a flow diagram of a process using enhanced safety checks in an embodiment of the disclosure.

FIG. 6 is a flow diagram of a process using enhanced safety checks in an embodiment of the disclosure. Process 600 uses input in the form of intermediate representations output from at least one of optimizing compilers targeted at hosts 605 and optimizing compilers targeted at accelerators 610 using embodiments of the disclosure. Safety checks 615 is an enhancement of typical safety criteria used for control-flow linearization including predetermined enhanced safety criteria. Safety checks 615 may be used as a plug-in replacement of or an enhancement of existing safety checks for control-flow linearization 620 in optimizing compilers targeted at hosts 605 and optimizing compilers targeted at accelerators 610 using embodiments of the disclosure. Use of embodiments of the disclosure enable further opportunities for a range of optimizations. In addition to loop vectorization 630, enhanced control-flow linearization in an embodiment of the disclosure also enables other optimizations including software pipelining 640, branch elimination 635 and associated benefits in predication 625 from precluding mispredictions, and instruction cache optimizations 645.

Embodiments of the disclosure typically provide an aggressive, but provably correct, relaxation of the safety criteria previously used for control-flow linearization. One skilled in the art would reasonably conclude the burden of dereferenceability proof is inherent to all existing techniques in the literature for control-flow linearization. Furthermore, focus of related literature is directed toward only mechanisms of control-flow linearization, rather than safety analysis enabling a transformation as in embodiments of the disclosure. For example, with regard to techniques of partial control-flow linearization only non-uniform branches are linearized, and then linearization is required to be complemented with traditional full control-flow linearization techniques. Similarly, in another example, the Intel® single program multiple data (SPMD) compiler for high-performance central processor unit programming (ISPC) framework is directed toward eliminating divergence in graphic processing unit kernels but requires a structured control flow. In yet another example, auto SIMD vectorization techniques typically employ control-flow linearization, but introduce unwanted control-flow artifacts.

In contrast to prior works, embodiments of the disclosure deal with safety criteria to determine the legality of control-flow linearization. In addition, the safety criteria in embodiments of the disclosure is enhanced, compared to that of previous solutions, to reduce false negatives, thereby, enabling additional valid opportunities for linearization not realized with previous solutions. Moreover, embodiments of the disclosure do not impose any undue structural requirement on the computer program source code. The only requirement in embodiments of the disclosure is loops must possess reducible control flow. For example, embodiments of the disclosure require the absence of multi-entry loops. In practice, almost all programs typically meet this criteria. Embodiments of the disclosure also do not invalidate any of the program semantics despite relaxation of the safety criteria.

Figure 7:
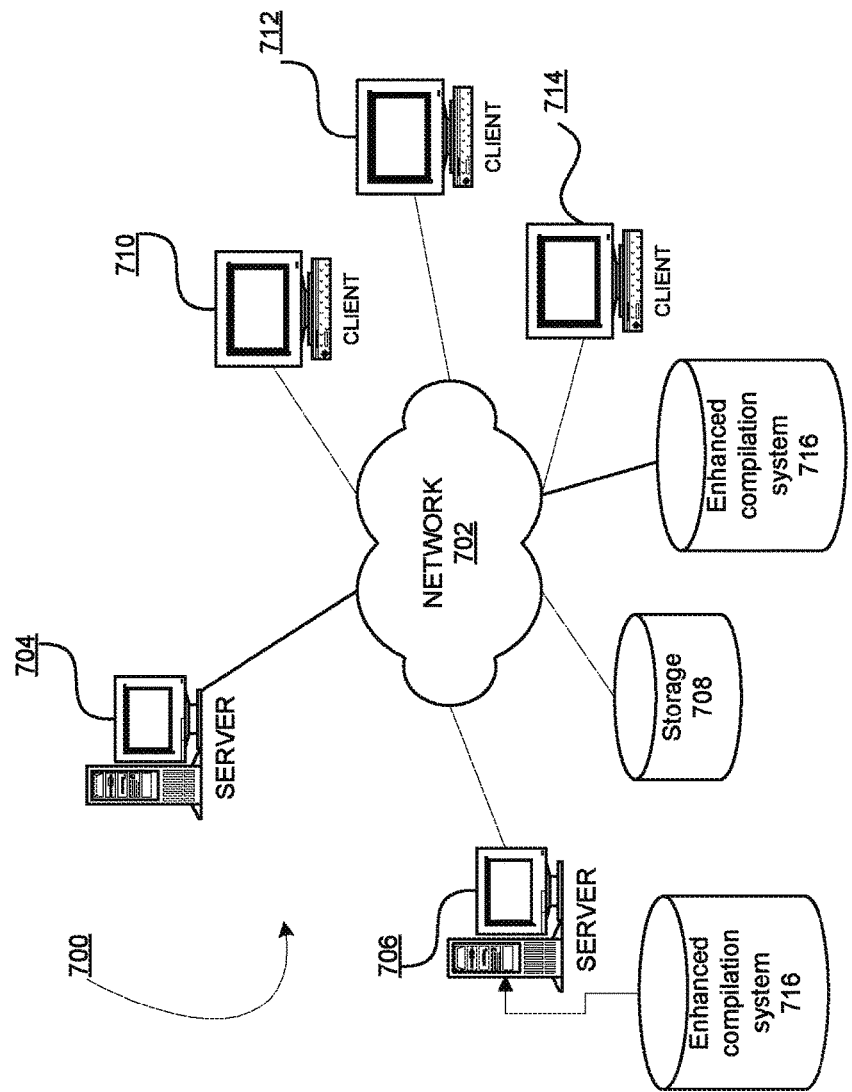
FIG. 7 is a block diagram of a network data processing system operable for various embodiments of the disclosure.
Figure 8:
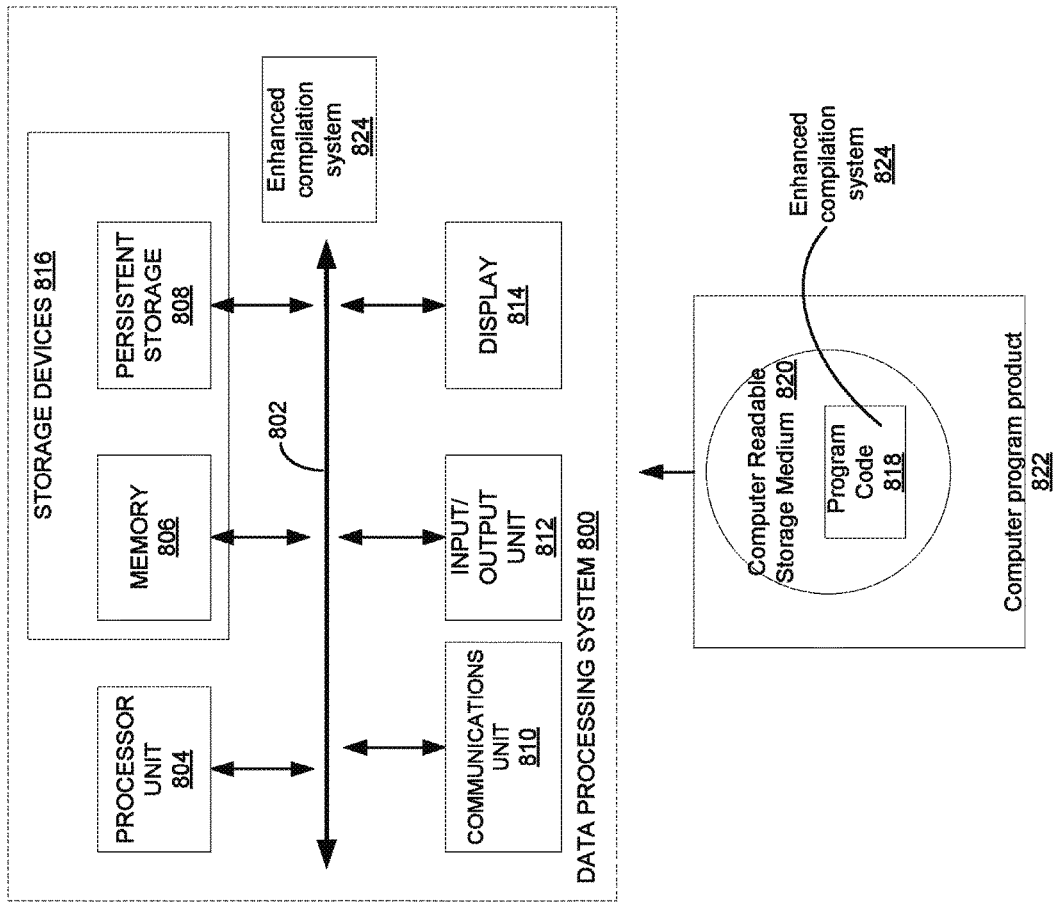
FIG. 8 is a block diagram of a data processing system in the network data processing system of FIG. 7 operable for various embodiments of the disclosure.

With reference now to FIGS. 7 and 8 these figures are only exemplary and are not intended to assert or imply any limitation with regard to the environments in which different embodiments may be implemented. Many modifications to the depicted environments may be made.

FIG. 7 is a pictorial representation of a network of data processing systems in which illustrative embodiments of the disclosure may be implemented. Network data processing system 700 is a network of computers in which the illustrative embodiments may be implemented. Network data processing system 700 contains network 702, which is the medium used to provide communications links between various devices and computers connected together within network data processing system 700. Network 702 may include connections, such as wire, wireless communication links, or fiber optic cables.

In the depicted example, server 704 and server 706 connect to network 702 along with storage unit 708. In addition, clients 710, 712, and 714 connect to network 702. Clients 710, 712, and 714 may be, for example, personal computers or network computers. In the depicted example, server 704 provides data, such as boot files, operating system images, enhanced compilation system 716 and applications to clients 710, 712, and 714. Clients 710, 712, and 714 are clients to server 704 in this example. In addition, enhanced compilation system 716, including enhanced safety checks 615 of FIG. 6, may also be directly accessed using network 702. Network data processing system 700 may include additional servers, clients, and other devices not shown.

In the depicted example, network data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 700 also may be implemented as a number of different types of networks, for example, an intranet, a local area network (LAN), or a wide area network (WAN). FIG. 7 is intended as an example, and not as an architectural limitation for the different illustrative embodiments.

With reference to FIG. 8 a block diagram of an exemplary data processing system operable for various embodiments of the disclosure is presented. In this illustrative example, data processing system 800 includes communications fabric 802, which provides communications between processor unit 804, memory 806, persistent storage 808, communications unit 810, input/output (I/O) unit 812, display 814 and enhanced compilation system 824. Enhanced compilation system 824 is a variant of enhanced compilation system 716 of FIG. 7.

Processor unit 804 serves to execute instructions for software that may be loaded into memory 806. Processor unit 804 may be a set of one or more processors or may be a multi-processor core, depending on the particular implementation. Further, processor unit 804 may be implemented using one or more heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example without limitation, data, program code in functional form, and/or other suitable information either on a temporary basis and/or a permanent basis. Memory 806, in these examples, may be, for example, a random-access memory or any other suitable volatile or non-volatile storage device. Persistent storage 808 may take various forms depending on the particular implementation. For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. In another example, enhanced compilation system 824, including enhanced safety checks 615 of FIG. 6, may also be contained within memory 806 or persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user using a graphical user interface or a nongraphical interface.

Instructions for the operating system, applications and/or programs may be located in storage devices 816, which are in communication with processor unit 804 through communications fabric 802. In these illustrative examples the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as instructions, program instructions, program code, computer usable program code, or computer readable program code that may be read and executed by a processor in processor unit 804. The program code in the different embodiments may be embodied on different physical or tangible computer readable storage media, such as memory 806 or persistent storage 808.

Program code 818 is located in a functional form on computer readable storage media 820 that is selectively removable and may be loaded onto or transferred to data processing system 800 for execution by processor unit 804. Program code 818 and computer readable storage media 820 form computer program product 822 in these examples. In one example, computer readable storage media 820 may be in a tangible form, such as, for example, an optical or magnetic disc that is inserted or placed into a drive or other device that is part of persistent storage 808 for transfer onto a storage device, such as a hard drive that is part of persistent storage 808. In a tangible form, computer readable storage media 820 also may take the form of a persistent storage, such as a hard drive, a thumb drive, or a flash memory that is connected to data processing system 800. The tangible form of computer readable storage media 820 is also referred to as computer recordable storage media or a computer readable data storage device. In some instances, computer readable storage media 820 may not be removable. In one example, program code 818 contains program code, which when executed, causes enhanced compilation system 824 to be fully functional.

Alternatively, program code 818 may be transferred to data processing system 800 from computer readable storage media 820 through a communications link to communications unit 810 and/or through a connection to input/output unit 812. The communications link and/or the connection may be physical or wireless in the illustrative examples.

In some illustrative embodiments, program code 818 may be downloaded over a network to persistent storage 808 from another device or data processing system for use within data processing system 800. For instance, program code stored in a computer readable data storage device in a server data processing system may be downloaded over a network from the server to data processing system 800. The data processing system providing program code 818 may be a server computer, a client computer, or some other device capable of storing and transmitting program code 818.

Thus, is described in one embodiment, a computer-implemented process for static safety analysis for control-flow linearization. The computer-implemented process comprising in response to receiving a control flow graph (CFG) and an intermediate representation of a computer program, identifying for a given loop, all memory load instructions belonging to one side of a diamond-shape structure in the CFG. A determination is made whether each representation of an address of each memory load instruction on the one side of the diamond-shape structure is also used on all other sides of the diamond-shape structure. In response to a determination that each representation of an address of each memory load instruction on the one side of the diamond-shape structure is also used on all other sides of the diamond-shape structure, the computer-implemented process determining whether an immediate predecessor of a top of the diamond-shape structure for the given loop post-dominates a header of the given loop. In response to a determination the immediate predecessor of the top of the diamond-shape structure for the given loop post-dominates the header of the given loop, the computer implemented process affirming safety of linearization of the diamond-shape structure in the CFG.

In an alternative embodiment of the disclosure, a computer-implemented process for managing control-flow linearization, in response to receiving a control flow graph (CFG) and intermediate representation of a computer program, identifies for a given loop, all memory load instructions belonging to one side of a diamond-shape structure in the CFG. The computer implemented process further determining whether each expression used in an address computation of each memory load instruction on the one side of the diamond-shape structure is also used on all other sides of the diamond-shape structure.

In response to a determination that each expression used in an address computation of each memory load instruction on the one side of the diamond-shape structure is also used on all other sides of the diamond-shape structure, the computer implemented process further determining whether an immediate predecessor of a top of the diamond-shape structure for the given loop post-dominates a header of the given loop. In response to a determination the immediate predecessor of the top of the diamond-shape structure for the given loop post-dominates the header of the given loop, the computer implemented process further affirming safety of linearization of the diamond-shape in the CFG.

In an alternative embodiment of the disclosure, a computer-implemented process for managing control-flow linearization, in response to receiving a control flow graph (CFG) and intermediate representation of a computer program, identifies for a given loop, all memory load instructions belonging to one side of a diamond-shape structure in the CFG.

The computer implemented process further determining whether each value number of an address of each memory load instruction on the one side of the diamond-shape structure is also used on all other sides of the diamond-shape structure. In response to a determination that each value number of an address of each memory load instruction on the one side of the diamond-shape structure is also used on all other sides of the diamond-shape structure, the computer implemented process further determining whether an immediate predecessor of a top of the diamond-shape structure for the given loop post-dominates a header of the given loop. In response to a determination the immediate predecessor of the top of the diamond-shape structure for the given loop post-dominates the header of the given loop, the computer implemented process further affirming safety of linearization of the diamond-shape in the CFG.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented process for static safety analysis for control-flow linearization, the computer-implemented process comprising:
   in response to receiving a control flow graph (CFG) and an intermediate representation of a computer program, identifying for a given loop, all memory load instructions belonging to one side of a diamond-shape structure in the CFG;
   determining whether each representation of an address of each memory load instruction on the one side of the diamond-shape structure is also used on all other sides of the diamond-shape structure;
   in response to a determination that each representation of an address of each memory load instruction on the one side of the diamond-shape structure is also used on all other sides of the diamond-shape structure, determining whether an immediate predecessor of a top of the diamond-shape structure for the given loop post-dominates a header of the given loop; and
   in response to a determination that the immediate predecessor of the top of the diamond-shape structure for the given loop post-dominates the header of the given loop, affirming safety of linearization of the diamond-shape structure in the CFG;
   wherein the affirming safety of linearization of the diamond-shape structure in the CFG uses predetermined enhanced safety criteria to reduce false negatives, the predetermined enhanced safety criteria comprising a part of safety checks used in at least one of a plug-in replacement for existing safety checks and an enhancement of the existing safety checks for control-flow linearization in optimizing compilers.

2. The computer-implemented process of claim 1, wherein the diamond-shape structure represents a control divergence from structures in the control-flow graph including an if-else statement, an if-then-else statement, and a switch statement.

3. The computer-implemented process of claim 1, wherein the intermediate representation of the computer program is an output of at least one of optimizing compilers targeted at hosts and optimizing compilers targeted at accelerators.

4. The computer-implemented process of claim 1, wherein the affirming safety of linearization of the diamond-shape structure in the CFG enables a set of optimizations including loop vectorization, software pipelining, branch elimination, predication to preclude mispredictions, and instruction cache optimizations.

5. The computer-implemented process of claim 1, wherein the method derives information from intra-procedural analysis of the computer program and operates on an intermediate code generation phase of an optimizing compiler.

6. A system for static safety analysis for control-flow linearization, the system comprising:
   a bus;
   a memory connected to the bus, having computer executable instructions stored thereon; and
   one or more processors connected to the bus, wherein at least one of the one or more processors executes the computer executable instructions of a method comprising:
   in response to receiving a control flow graph (CFG) and intermediate representation of a computer program, identifying for a given loop, all memory load instructions belonging to one side of a diamond-shape structure in the CFG;
   determining whether each address of each memory load instruction on the one side of the diamond-shape structure is also used on all other sides of the diamond-shape structure;
   in response to a determination that each address of each memory load instruction on the one side of the diamond-shape structure is also used on all other sides of the diamond-shape structure, determining whether an immediate predecessor of a top of the diamond-shape structure for the given loop post-dominates a header of the given loop; and
   in response to a determination that the immediate predecessor of the top of the diamond-shape structure for the given loop post-dominates the header of the given loop, affirming safety of linearization of the diamond-shape in the CFG;
   wherein the affirming safety of linearization of the diamond-shape structure in the CFG uses predetermined enhanced safety criteria to reduce false negatives, the predetermined enhanced safety criteria comprising a part of safety checks used in at least one of a plug-in replacement for existing safety checks and an enhancement of the existing safety checks for control-flow linearization in optimizing compilers.

7. The system of claim 6, wherein the diamond-shape structure represents a control divergence from structures in the control-flow graph including an if-else statement, an if-then-else statement, and a switch statement.

8. The system of claim 6, wherein the intermediate representation of the computer program is an output of at least one of optimizing compilers targeted at hosts and optimizing compilers targeted at accelerators.

9. The system of claim 6, wherein the affirming safety of linearization of the diamond-shape structure in the CFG enables a set of optimizations including loop vectorization, software pipelining, branch elimination, predication to preclude mispredictions, and instruction cache optimizations.

10. The system of claim 6, wherein execution of the computer executable instructions of the method derives information from intra-procedural analysis of the computer program and operate on an intermediate code generation phase of an optimizing compiler.

11. A computer program product comprising a computer readable storage medium having computer readable program instructions for static safety analysis for control-flow linearization thereon for causing a processor to perform a method comprising:
   in response to receiving a control flow graph (CFG) and intermediate representation of a computer program, identifying for a given loop, all memory load instructions belonging to one side of a diamond-shape structure in the CFG;
   determining whether each address of each memory load instruction on the one side of the diamond-shape structure is also used on all other sides of the diamond-shape structure;
   in response to a determination that each address of each memory load instruction on the one side of the diamond-shape structure is also used on all other sides of the diamond-shape structure, determining whether an immediate predecessor of a top of the diamond-shape structure for the given loop post-dominates a header of the given loop; and in response to a determination that the immediate predecessor of the top of the diamond-shape structure for the given loop post-dominates the header of the given loop, affirming safety of linearization of the diamond-shape in the CFG;

wherein the affirming safety of linearization of the diamond-shape structure in the CFG uses predetermined enhanced safety criteria to reduce false negatives, the predetermined enhanced safety criteria comprising a part of safety checks used in at least one of a plug-in replacement for existing safety checks and an enhancement of the existing safety checks for control-flow linearization in optimizing compilers.

12. The computer program product of claim 11, wherein the diamond-shape structure represents a control divergence from structures in the control-flow graph including an if-else statement, an if-then-else statement, and a switch statement.

13. The computer program product of claim 11, wherein the intermediate representation of the computer program is an output of at least one of optimizing compilers targeted at hosts and optimizing compilers targeted at accelerators.

14. The computer program product of claim 11, wherein the computer readable program instructions for affirming safety of linearization of the diamond-shape structure in the CFG further comprising enabling a set of optimizations including loop vectorization, software pipelining, branch elimination, predication to preclude mispredictions, and instruction cache optimizations.

15. The computer program product of claim 11, wherein the method derives information from intra-procedural analysis of the computer program and operates on an intermediate code generation phase of an optimizing compiler.

* * * * *